Sept. 16, 1969 D. F. CALDEMEYER 3,467,455

ENTERTAINMENT CENTER

Filed Aug. 9, 1966

INVENTOR.

DANIEL F. CALDEMEYER

BY

Warren D. Flackbert

Attorney

United States Patent Office
3,467,455
Patented Sept. 16, 1969

3,467,455
ENTERTAINMENT CENTER
Daniel F. Caldemeyer, 4300 Jennings Lane,
Evansville, Ind. 47712
Filed Aug. 9, 1966, Ser. No. 571,254
Int. Cl. A47b *81/06, 88/00;* H05k *5/00*
U.S. Cl. 312—7 1 Claim

ABSTRACT OF THE DISCLOSURE

An entertainment center in the form of an integrated furniture unit housing a television receiver and various audio components characterized by the placement of the television receiver so that the viewer looks upwardly to the screen thereof and in an arrangement whereby the television receiver can be moved outwardly and rotated in a horizontal plane, the latter arrangement also being provided by a speaker element forming one of the audio components.

The present invention relates to an entertainment center, and more particularly to an integrated furniture unit which permits, among other features, total television viewing and full sound distribution.

As is known, the conventional television receiver or set is sold in cabinet form or as a portable, where the former is generally styled to become a part of the other furnishings in the home, for example. On the other hand, the portable television set normally does not have the desired aesthetic qualities for use in the main or more formal areas in a typical home. In any event, the existing floor type cabinet television sets are mostly deficient because of the height of the picture tube placement therein, usually resulting in a neck strain occasioned by downward viewing, especially when seated in a recliner type chair.

Moreover, the placement of the cabinet television set is rather critical, in that at least some of the viewers in the room have to turn their heads in the direction of the fixed set because of chair placement and, therefore, view the screen at a distorted angle. In other words, most television viewers in any given area are more or less forced to view the set at an unrelaxed muscle position, contributing to over-all neck strain. While the aforesaid portable television receiver can be positioned mainly where desired, its appearance is the biggest drawback, and the mobility thereof is still restrained as to where the set can be placed conveniently and yet to the best over-all appearance of the given area.

By virtue of the instant invention, the applicant herein has provided a new and novel entertainment center comprising a furniture unit designed to integrate various components in a single housing, such components including, by way of example, a portable television receiver, a record changer, an AM-FM tuner, an audio amplifier, tape reproduction equipment, and, as well, the desired, loud speaker system. Among the important features provided by the invention at hand is the arrangement for receiving any desired portable television set of the owner's choice and for providing for the total viewing thereof, coupled with an adjustable speaker placement which permits optimum room audio adjustments for the listener.

More specifically, the portable television receiving area is typically disposed proximate the top of the unit, so that the viewer looks directly or slightly upwardly at proper eye level, and thereby occasions the least amount of strain on neck and eye muscles because of the natural viewing position. In order to permit such total television viewing, the instant invention affords the movement of the television set outwardly from the entertainment center, and at angles with respect to the front thereof and towards the direction of the viewer. In other words, the set is selectively moved in the direction of the viewer, permitting straight forward viewing to properly defined side angle viewing.

Additionally, in order to achieve full sound distribution, the speakers in the instant invention are arranged to be movable outwardly or sideways from the cabinet and angularly with respect to the front of the unit, again in the direction of the listener. In other words, full sound is also achievable, being directed at the viewer and/or listener, considering the best audio adjustments for the given area.

The invention at hand represents an important contribution to viewing and/or listening comfort, and represents a milestone insofar as an integrated furniture unit is concerned. As should be understandable, the concept is further amplified by the fact that various components can be added to the unit from time to time to achieve the final desired end results. In this connection, the individual may buy the entertainment center unit first, and then add and replace the desired audio and television equipment, having such important add-on and replacement space available. The instant arrangement permits careful selection of components to the individual's taste, and represents an easy purchasing arrangement towards the desired goal.

A better understanding of the present invention will become more apparent from the following description, taken in conjunction with the accompanying drawing, wherein FIG. 1 is a view in front elevation showing an entertainment center in accordance with the teachings of the instant invention;

Figure 1:
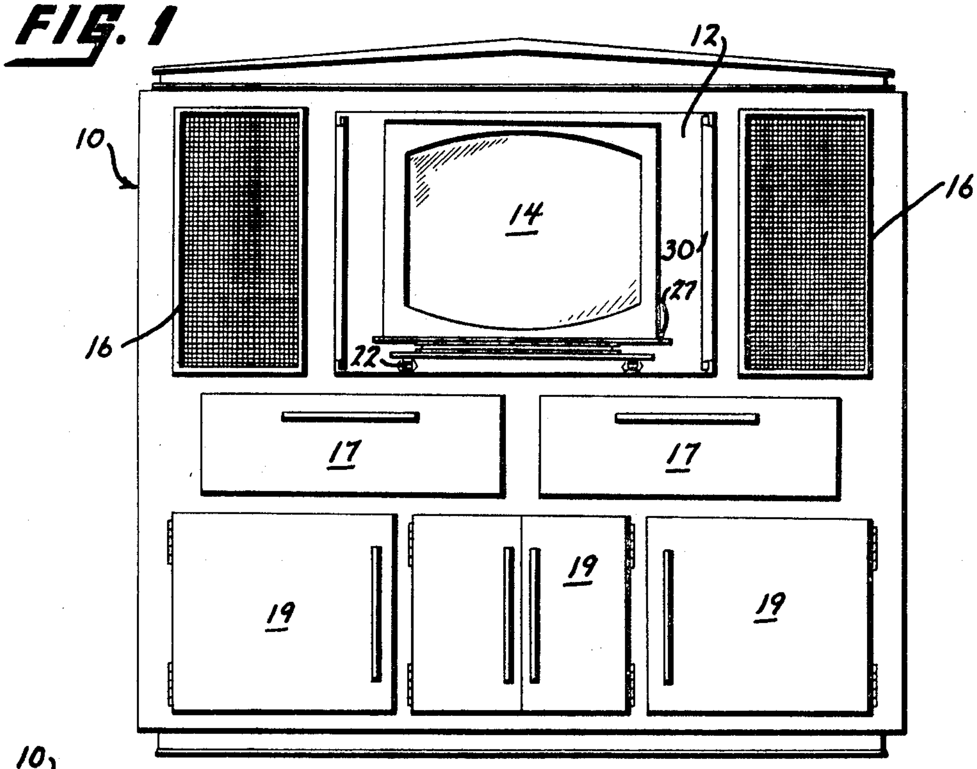

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel entertainment center 10 is characterized as an integrated upright furniture unit, styled in various manners, as desired, with or without decorative doors to cover the components. Basically, and with particular reference to FIG. 1, the entertainment center 10 includes a space 12 for receiving a portable television set 14; sound speakers 16; spaces 17 for receiving, for example, audio controls as well as tape cartridge and recording equipment; and, record storage or other expansion space 19. It should be understood that all of the preceding components are arranged in accordance with the principles underlying the invention at hand, and, of course, the desired furniture styling.

In the preferred embodiment of the invention, the placement of the television receiver 14 is at the upper central portion of the furniture unit, i.e. in such a position that the viewer looks upwardly at a convenient eye level and at a natural viewing position for relaxed eye and neck muscles. In any event, in a typical arrangement, pull-out sides 22 are disposed on the base of the space 12, carrying a mounting member 24, as more specifically shown in FIG. 5.

A turntable 26 is positioned on the mounting member 24, where a television receiver support member 27 is secured to such turntable 26. In one form of the invention, sliding or hinged doors 30 are provided, typically movable in channels (not shown), so that, if desired, the television receiver 14 can be concealed when not in use.

Figures 2, 3, 4, 5:
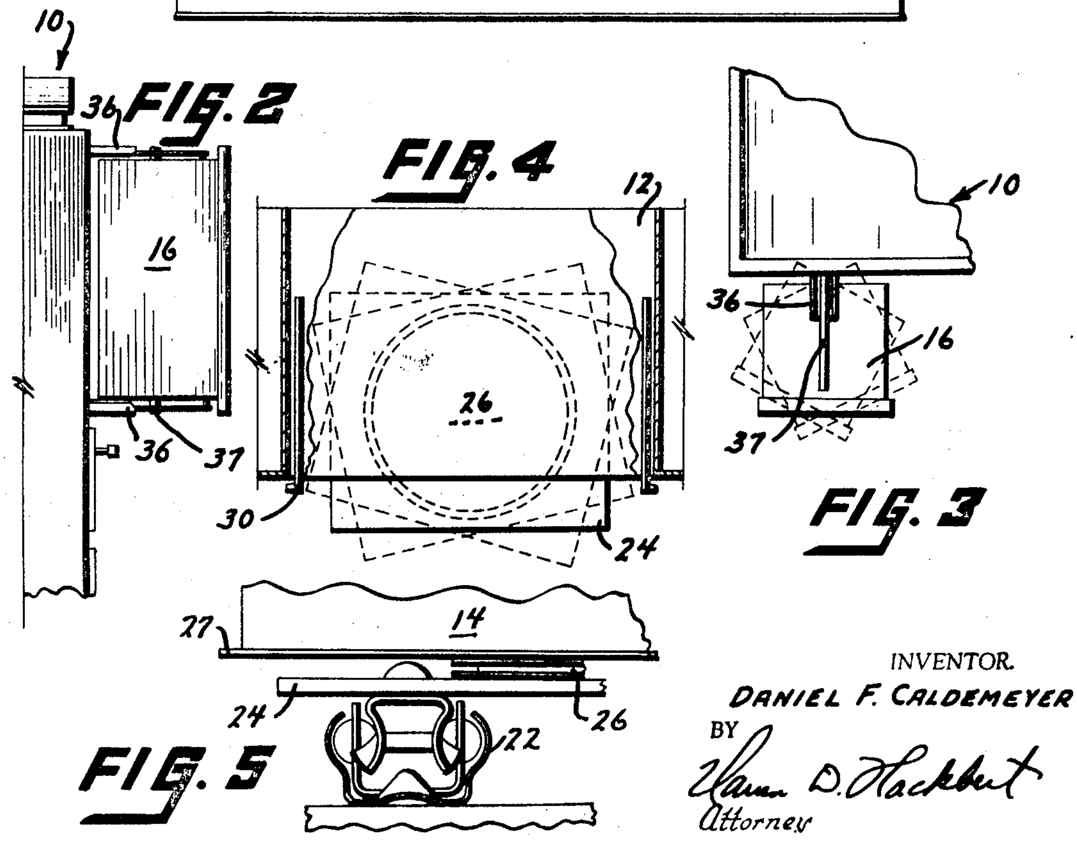
FIG. 2 is a view in side elevation, partly fragmentary, showing a speaker extended from its normal position within the integrated unit of FIG. 1.
FIG. 3 is a plan view, partly fragmentary, of the speaker unit of FIG. 2, in an extended position, the broken lines representing various angular positions.
FIG. 4 is a top plan view of the structure which receives the television receiver, showing same extended, with the broken lines also showing various angular positions thereof; and, FIG. 5 is a detailed front view of one arrangement for receiving the television set to achieve the results of FIG. 4.

With reference now to FIG. 4, a portable television set of 14 of the purchaser's own choice is positioned on the support member 27, where the important feature afforded herein, i.e. total television picture viewing, is achievable by moving the mounting member 24 outwardly to any desired extended position and, thereafter, rotating or swiveling the television support member 27 through the turntable 26 to any desired angular viewing position. The broken lines of FIG. 4 represent typical positions for the television support member 27, the particular desired position depending upon where the viewer is seated with relation to the entertainment center 10. By providing for the angular changes, the viewer directly faces the picture tube, or is at a convenient viewing angle, the latter serving to minimize distortion.

FIGS. 2 and 3 are directed to a typical arrangement for affording full sound distribution for the unit, considering the best audio requirements for the area. In this connection, extendible slide members 36 mount the enclosures for the sound speakers 16, where pivots 37 permit angular adjustments. As should be readily understandable from FIG. 4, each speaker 16 may be extended from the over-all unit, and then moved to face in the direction of the listener to suit best audio requirements, even to the extent of achieving a stereo effect.

From the preceding, it should be understood that the applicant herein has provided for a new and novel entertainment center which is capable of being completed by the purchaser on a piece-by-piece basis. In other words, after the unit is purchased, the user may obtain any desired portable television receiver for use therewith and, thereafter, specialized audio components of his own liking and taste.

The extendible and pivotable relationships in regard to both the television receiver and to the loud speaker elements provide features not at all present heretofore. The television receiver positioning permits improved full screen viewing, and the height of the television receiver screen affords comfort for the viewer when in a reclining television viewing position. Additionally, full sound distribution is readily achievable for optimum pleasure in listening.

The entertainment center described hereabove is susceptible, of course, to various changes within the spirit of the invention. For example, and as stated, the styling of the integrated unit 10 may be varied, including proportioning, and different arrangements employed for effecting extension and pivoting of both the television receiver and the sound speaker elements. Moreover, other speaker elements may be employed in the available storage spaces for different sound results.

I claim:

1. An integrated furniture unit housing a television receiver and at least one speaker element comprising slide means for extending said television receiver from the unit and pivot means for rotating said television receiver in a horizontal plane with respect to the front of the unit, where slide means are provided for extending said at least one speaker element from the unit and pivot means are provided for rotating said at least one speaker element in a horizontal plane.

References Cited

UNITED STATES PATENTS

| | | | |
|---|---|---|---|
| 2,070,055 | 2/1937 | Lerien | 312—322 |
| 2,413,922 | 1/1947 | Jensen et al. | 312—7 |
| 2,564,658 | 8/1951 | Jakeway | 312—343 |
| 2,610,099 | 9/1952 | McNamara | 312—322 |
| 3,030,165 | 4/1962 | Nagy | 312—322 |
| 3,063,774 | 11/1962 | Silver | 312—322 |
| 3,112,968 | 12/1963 | Cotton et al. | 312—7 |
| 3,146,048 | 8/1964 | Graham et al. | 312—323 |
| 3,169,772 | 2/1965 | Bentsen | 312—8 |
| 3,272,583 | 9/1966 | Averdieck | 312—343 |

BOBBY R. GAY, Primary Examiner

J. L. KOHNEN, Assistant Examiner

U.S. Cl. X.R.

312—322